Sept. 28, 1943.  E. O. PARK  2,330,444
REAR VIEW MIRROR FOR VEHICLES
Filed April 16, 1941  2 Sheets-Sheet 1
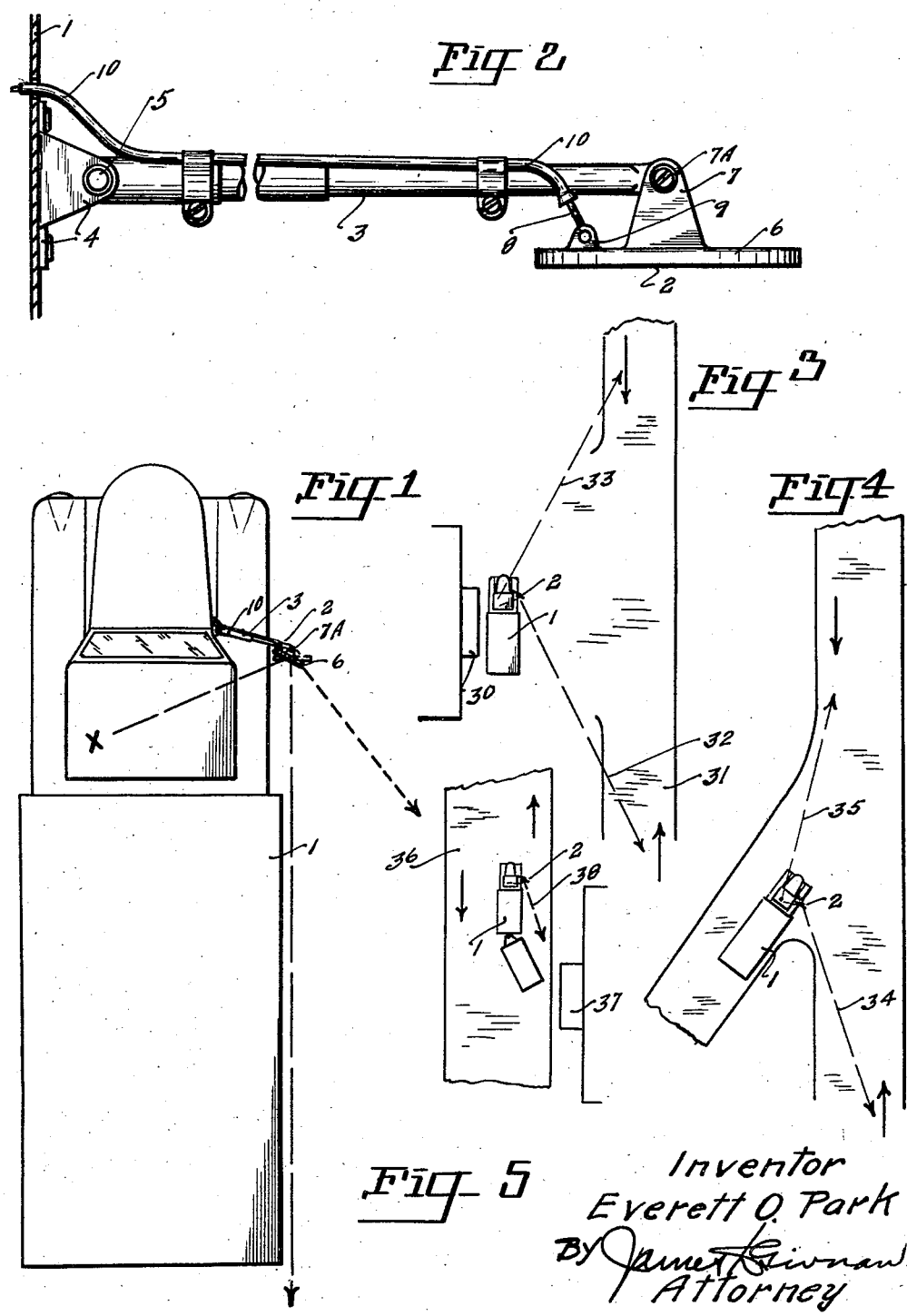
Inventor
Everett O. Park
By James Ginnaw
Attorney Sept. 28, 1943.   E. O. PARK   2,330,444
REAR VIEW MIRROR FOR VEHICLES
Filed April 16, 1941   2 Sheets-Sheet 2
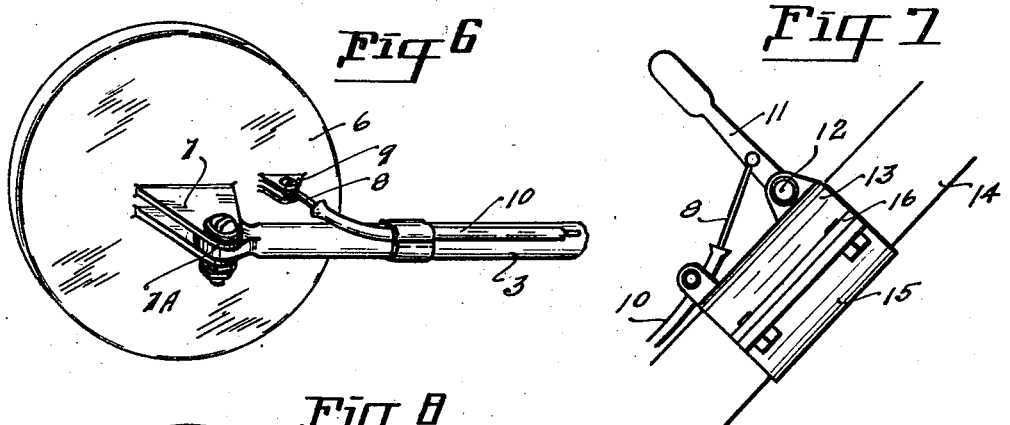
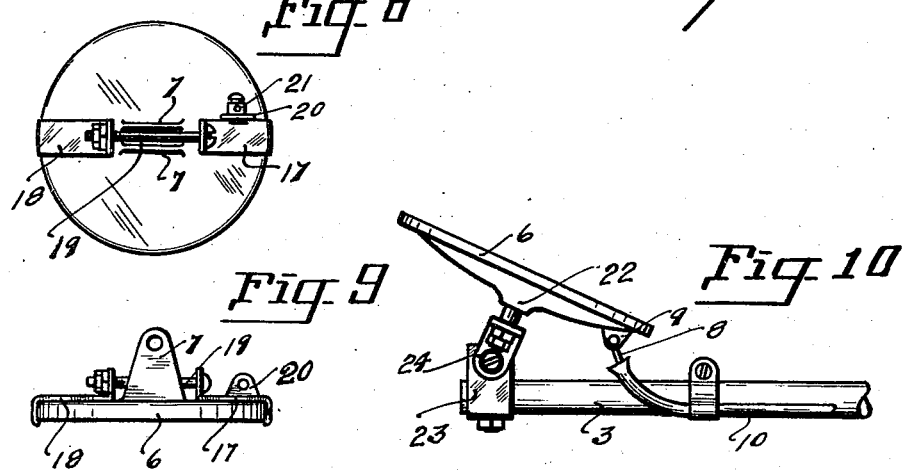
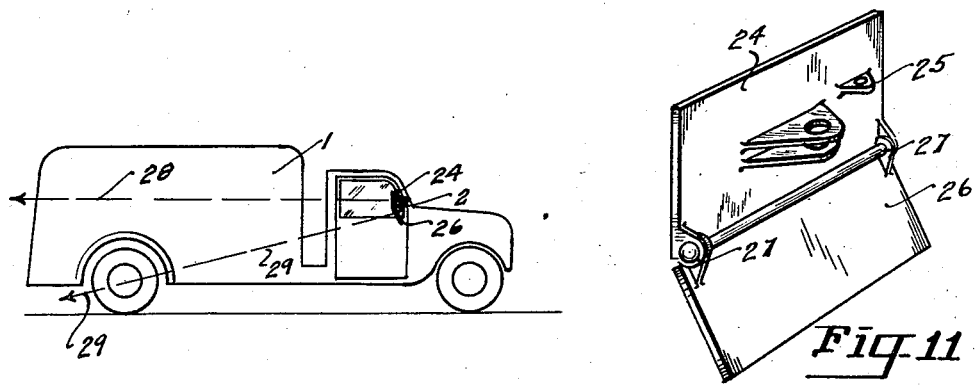
Inventor
Everett O. Park
By James Finnan
Attorney Patented Sept. 28, 1943

2,330,444

UNITED STATES PATENT OFFICE 2,330,444

REARVIEW MIRROR FOR VEHICLES

Everett O. Park, Albany, Oreg.

Application April 16, 1941, Serial No. 388,746

2 Claims. (Cl. 88—93)

This invention relates to rear view mirrors for vehicles and is especially adapted for use on large trucks, stages, and the like.

The primary object of the invention is to provide quick and convenient means for changing the angle of reflection on a horizontal plane in rear view mirrors by a suitable control.

In the operation of large trucks heretofore, it has been difficult for the driver of the truck to see what was coming behind him on the right side of the truck, especially when parking the truck into loading platforms, coming into arterial highways from an angle and pulling out into highways from a loading platform. Heretofore, in order to see what was coming at these different angles, the driver was compelled to lean over away from his controls to obtain a view out and to the rear of the right side of the truck. In doing this, he was creating a traffic hazard while operating his truck; and therefore, it is the primary object of this invention to provide means of changing the angle of reflection on a horizontal plane to the operator from the rear view mirror from any desired angle to the rear and side of truck.

Another feature of the invention is that the driver does not have to move from his normal driving position to know what is going on to the rear of his truck; and, at the same time, he is able to watch for oncoming traffic.

Another object of this invention is to provide means of reflection from a downward position towards the rear of the truck, for instance, the position of the rear wheel relative to curbings, and so forth.

A still further object of the invention is to provide adapters for adapting the principles of this invention to already existing rear view mirrors.

These and other incidental objects will be apparent in the drawings, specification and claims to follow.

In the drawings:

Figure 1 is a plan view of a conventional truck, having my new and improved adjustable rear view mirror mounted thereon.

Figure 2 is an enlarged plan view of the mirror and its supporting mechanism, partially broken away for convenience of illustration.

Figures 3, 4, and 5 are diagrammatical views illustrating the different driving conditions encountered relative to the operation of my new and improved rear view mirror.

Figure 6 is a perspective fragmentary rear view of Figure 2.

Figure 7 is a preferred form of control mechanism for controlling the angle of the mirror.

Figure 8 is a modified form of the invention applied to a standard mirror.

Figure 9 is an edgewise view of Figure 8.

Figure 10 is a further modification for adapting my new and improved adjustable feature to a mirror having a ball and socket holding arrangement.

Figure 11 illustrates a further modification of a rear view mirror hinged in the middle on a horizontal plane so that two different vertical reflections can be directed to the operator of the vehicle.

Figure 12 illustrates the utility shown in Figure 11 relative to the vehicle.

Referring now more particularly to the drawings:

Reference numeral 1 indicates a motor vehicle having my new and improved rear view mirror, generally indicated at 2, mounted thereon. A supporting arm, or bracket, 3 may be attached by any suitable means, such as a fixture or bracket, 4 to the vehicle 1, either rigidly or pivotally connected thereto, as at 5. This supporting arm, or bracket, may be adjustable in length, as illustrated. My invention consists of pivotally mounting the mirror in its housing 6 at 7A to the outer end of the supporting arm 3 by rearwardly extending brackets 7 formed on the mirror housing. The angle of the mirror relative to the arm 3 may be regulated by movement of a flexible control wire 8 whose one end is secured to a bracket 9, formed on the rear surface of the mirror housing. The control wire 8 passes through a conduit 10, and its opposite end is secured to a suitable control lever 11 (see Figure 7) located within reach of the driver of the vehicle. This lever is pivotally mounted at 12 to a clamp 13 which may be secured to the steering column of the vehicle 14 by the holding cap 15; or the holding cap 15 may be eliminated, and the base 16 of the clamp may be secured to any flat surface within the vehicle. I do not wish to be limited to any particular form of control, either as to the lever or the connection between the lever 11 and the mirror 6. This control might be a link connection of some other suitable construction. The primary object of my invention is to change the angle of the mirror 6 on a horizontal plane relative to its reflection, and this angle being adjustable by the operator of the vehicle.

Figures 2 and 6 illustrate construction that might be used where the mirror is manufactured with the intention of being used as above described, but my invention may be adapted to a standard mirror, as illustrated in Figures 8, 9, and 10 by suitable adapters comprising clamps, 17 and 18, which are held in position on the mirror by suitable fastening means, as holding bolt 19. This bolt may be located between a pair of brackets 7, thereby holding the clamps in a fixed position. The clamps 17 carry a bracket 20 and suitable swivel connection 21 for holding the end of the control wire 8, as heretofore described. The clamps, 17 and 18, by means of the bolt 19 being adjustable with respect to each other, are capable of accommodating various sizes of standard circular mirrors whether intended for use on vehicles, or not. Thus, in case of breakage, a temporary replacement may be quickly made.

Figure 10 illustrates the type of mirror having a ball and socket connection 22. In this type of mirror, suitable adapter brackets, 23 and 24, permit the angular adjustment of the mirror and is just another illustration of an adapter for standard constructed mirrors.

In Figure 11, a standard mirror is illustrated at 24, having a bracket 25 added thereto to carry out the principle of my invention, as heretofore described. A second mirror 26 is adjustably attached, as at 27, to the mirror 24, so that they may both swing together as a single unit. The angle between the mirror 24 and 26 may be changed to carry out the principle illustrated in Figure 12. The reflection line 28 is the reflection directed to the driver by the mirror 24, and both reflection lines may be adjusted at an angle to the truck as best illustrated in Figures 3, 4, and 5.

Pulling away from a loading platform 30, as shown in Figure 3, the truck driver would ordinarily have to lean out of the cab to the right side of his truck which, in the sizes, is very difficult to do in order to see the traffic approaching from the rear on the highway 31; but with my new and improved mirror, he may grasp the lever 11, adjust the angle of the mirror 6 so that he may get the reflection line 32 to the mirror without moving from his driving position, at which time he has full view of the oncoming traffic, as indicated by the line 33. In Figure 4, I illustrate another condition where the driver would ordinarily have to lean out of his truck to get vision on the line 34 of the traffic coming toward him from the rear at a Y intersection; but with my invention, the reflection line 34 is visible in the mirror; and correct vision, without moving from his driving position, is had of the oncoming traffic on line 35.

Figure 5 shows a common backing-up maneuver wherein the truck driver would have to come in on the wrong side of the highway 36 in order to back into the loading platform 37, so that he might have a correct view from the left side of the truck; but with my adjustable mirror, he may back into the platform 37 without leaving the right side or proper lane of the highway by adjusting the mirror, as illustrated in Figure 5 whereupon the reflection is that indicated by the line 38.

With reference to Figure 2, it will be noted that the conduit 10 is curved at both of its ends; and accordingly, the control cable 8 is in frictional contact with the interior of the tube at all times, so that the cable, due to its friction, will remain fixed in any position to which it is moved, in swinging or adjusting the mirror.

By this arrangement, the mirror is prevented from moving out of adjustment by vibrations, road shock, and the like.

There are many driving operations that are made safer and more convenient by my new and improved adjustable rear view mirror.

I do not wish to be limited to the particular form of mechanical embodiment disclosed, as other mechanical equivalents may be substituted still coming within the scope of the claims to follow.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

1. A rear vision mirror for vehicles, comprising an arm attached at its inner end to the vehicle body and extending outwardly therefrom, a mirror adjustably attached to the outer end of the arm in spaced relation to the exterior of the vehicle body, a conduit secured to and extending lengthwise of the arm and curved at both of its ends, a control wire slidable within said conduit and attached at one of its ends to the mirror and terminating at its opposite end within the vehicle, said conduit being adapted through the medium of its curved ends to frictionally engage the control wire in any of its mirror-adjusting positions.

2. A rear vision mirror for vehicles, comprising a supporting arm attached at its inner end to a vehicle body, the outer end of said arm terminating in spaced relation to the vehicle body, a mirror adjustably attached to the outer end of said arm, said mirror comprising two reflecting surfaces attached to each other and adjustable into fixed angular relations with respect to each other and adapted to be handled as a unit, said mirror being pivotally mounted to said supporting arm for swingable movement about a vertical axis whereby a range of reflection from one of said reflecting surfaces is visible rearwardly in a horizontal plane, and a range of reflection in an inclined rear plane is visible from the other of said reflecting surfaces.

EVERETT O. PARK.